United States Patent
Abraham et al.

(10) Patent No.: US 9,361,159 B2
(45) Date of Patent: Jun. 7, 2016

(54) RUNTIME CHARGEBACK IN A SIMULTANEOUS MULTITHREADING (SMT) ENVIRONMENT

(71) Applicant: International Business Machines Corporation, Armonk, NY (US)

(72) Inventors: Ansu A. Abraham, Danbury, CT (US); Gary M. King, Watervliet, NY (US); Daniel V. Rosa, Highland, NY (US); Donald W. Schmidt, Stone Ridge, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 103 days.

(21) Appl. No.: 14/231,794

(22) Filed: Apr. 1, 2014

(65) Prior Publication Data

US 2015/0277984 A1    Oct. 1, 2015

(51) Int. Cl.
*G06F 9/50* (2006.01)
*G06F 9/455* (2006.01)
*G06F 9/30* (2006.01)

(52) U.S. Cl.
CPC ............ *G06F 9/5077* (2013.01); *G06F 9/3009* (2013.01); *G06F 9/45533* (2013.01); *G06F 9/45545* (2013.01); *G06F 2009/45579* (2013.01); *G06F 2209/5018* (2013.01)

(58) Field of Classification Search
CPC . G06F 9/5077; G06F 9/3009; G06F 9/45533; G06F 9/45545; G06F 2009/45579; G06F 2209/5018
USPC ............................................................. 718/1
See application file for complete search history.

(56) References Cited

U.S. PATENT DOCUMENTS

| 7,802,073 B1 * | 9/2010 | Cheng ................... G06F 9/3851 712/10 |
| 7,945,908 B1 | 5/2011 | Waldspurger et al. |
| 8,250,395 B2 | 8/2012 | Carter et al. |
| 8,402,463 B2 | 3/2013 | Norton et al. |
| 2003/0208392 A1 | 11/2003 | Shekar et al. |
| 2006/0242642 A1 * | 10/2006 | Yamamura ............ G06F 9/4881 718/100 |

(Continued)

OTHER PUBLICATIONS

IBM, "z/Architecture: Principles of Operation," SA22-7232-08; Tenth Edition (Sep. 2012); pp. 1-1568 (submitted in two separate parts).

*Primary Examiner* — Li B Zhen
*Assistant Examiner* — Daniel Wei
(74) *Attorney, Agent, or Firm* — Cantor Colburn LLP; William A. Kinnaman, Jr.

(57) ABSTRACT

A technique for chargeback with simultaneous multithreading (SMT) by a computer is provided. One or more of an operating system and a second-level hypervisor of the computer manage a logical core configuration for simultaneous multithreading, the operating system and/or the second-level hypervisor has control over a logical core and control over logical threads on the logical core. The operating system and/or the second-level hypervisor is configures a host hypervisor to assign an entirety of the logical core to a single physical core, such that one logical core executes per physical core. The logical core is run on the single physical core on an exclusive basis for a period of time, such that the logical threads of the logical core execute on physical threads of the single physical core. A capacity use time is determined for each of the logical threads executing on the physical threads of the single physical core.

13 Claims, 7 Drawing Sheets

(56) References Cited

U.S. PATENT DOCUMENTS

| | | |
|---|---|---|
| 2011/0162062 A1 | 6/2011 | Kumar et al. |
| 2012/0227042 A1 | 9/2012 | Zedlewski et al. |
| 2013/0047011 A1 | 2/2013 | Dice et al. |
| 2013/0311811 A1 | 11/2013 | Bose et al. |
| 2014/0068792 A1 | 3/2014 | Kondou et al. |
| 2014/0101411 A1 | 4/2014 | Sakarda |
| 2014/0282521 A1 | 9/2014 | Lango et al. |

* cited by examiner

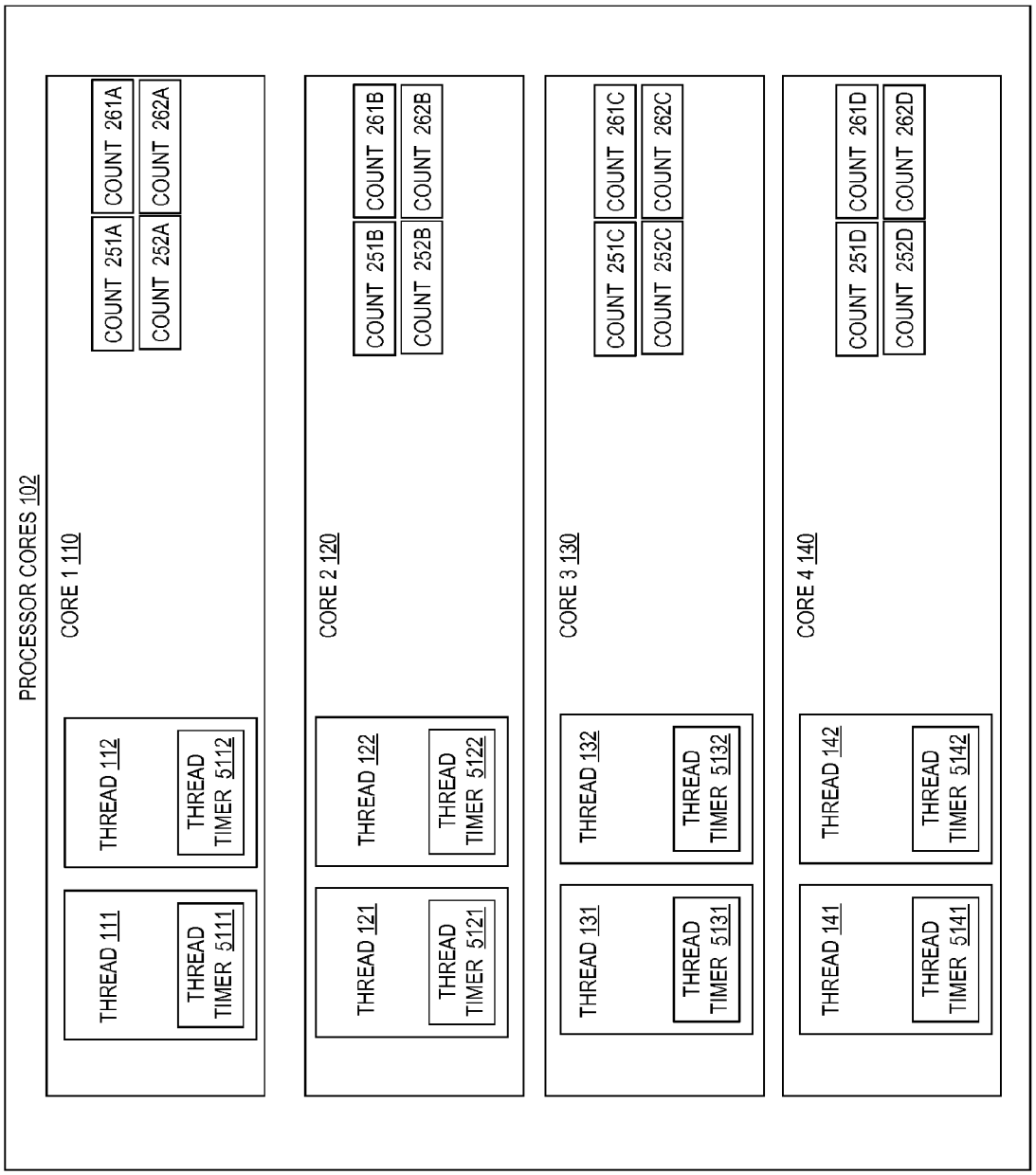

RUNTIME CHARGEBACK IN A SIMULTANEOUS MULTITHREADING (SMT) ENVIRONMENT

BACKGROUND

The present invention relates to a computer system supporting multithreading (MT), and more specifically, to runtime chargeback in a simultaneous multithreading (SMT) environment.

As processor speeds of computer systems have increased over the past decades, there has not been a proportional increase in the speed in which the memory of such computer systems can be accessed. Thus, the faster the processor's cycle time, the more pronounced is the delay to resolve data located in memory. The effects of such delays have been mitigated by adding additional caches to the memory nest, and in recent processors, with SMT.

SMT allows various core resources of a processor to be shared by a plurality of instruction streams known as threads. Core resources can include instruction-execution units, caches, translation-lookaside buffers (TLBs), and the like, which may be collectively referred to generally as a core. A single thread whose instructions access data typically cannot utilize the full core resource due to the latency to resolve data located in the memory nest. Multiple threads accessing data sharing a core resource typically result in a higher core utilization and core instruction throughput, but individual threads experience slower execution. In a super-scalar processor simultaneous-multithreading (SMT) implementation, multiple threads may be simultaneously serviced by the core resources of one or more cores.

In contemporary hardware platforms, MT is typically implemented in a manner that is transparent to multiple operating systems (OSes) running different workloads through virtualization of the MT hardware. One advantage of transparent MT is that the OS does not require modification to utilize the MT hardware. With this design point, the MT hardware becomes responsible for balancing the delivery of a high core instruction throughput (by increasing the number of executing threads per core) with a high thread speed (by minimizing the number of executing threads per core). Transparent MT operation with respect to the OS can result in high variability of response time, capacity provisioning, capacity planning, and charge back. This variability can occur because each OS is unaware of whether its work units execute with exclusive use of a core, or whether its tasks are executing as threads that share a core. For example, if the hardware runs a single MT thread per core when there is low compute utilization and runs with high thread density when there is high compute utilization, an OS has difficulty determining capacity in use (and charge back) and total remaining available capacity and delivering a repeatable transaction response time.

SUMMARY

According to one embodiment, a method for chargeback with simultaneous multithreading (SMT) by a computer is provided. One or more of an operating system and a second-level hypervisor of the computer manage a logical core configuration for simultaneous multithreading, the operating system and/or the second-level hypervisor has control over a logical core and control over logical threads on the logical core. The operating system and/or the second-level hypervisor is configures a host hypervisor to assign an entirety of the logical core to a single physical core, such that one logical core executes per physical core. The logical core is run on the single physical core on an exclusive basis for a period of time, such that the logical threads of the logical core execute on physical threads of the single physical core. A capacity use time is determined for each of the logical threads executing on the physical threads of the single physical core.

According to one embodiment, a computer program product for chargeback with simultaneous multithreading (SMT) is provided. The computer program product include a computer readable storage medium having program instructions embodied therewith, and the program instructions are executable by a computer to cause the computer to perform a method. One or more of an operating system and a second-level hypervisor of the computer manage a logical core configuration for simultaneous multithreading, the operating system and/or the second-level hypervisor has control over a logical core and control over logical threads on the logical core. The operating system and/or the second-level hypervisor is configures a host hypervisor to assign an entirety of the logical core to a single physical core, such that one logical core executes per physical core. The logical core is run on the single physical core on an exclusive basis for a period of time, such that the logical threads of the logical core execute on physical threads of the single physical core. A capacity use time is determined for each of the logical threads executing on the physical threads of the single physical core.

According to one embodiment, an apparatus for simultaneous multithreading (SMT) is provided. The apparatus includes a computer and memory having computer-executable instructions that, when executed by the computer, cause the computer to perform operations. One or more of an operating system and a second-level hypervisor of the computer manage a logical core configuration for simultaneous multithreading, the operating system and/or the second-level hypervisor has control over a logical core and control over logical threads on the logical core. The operating system and/or the second-level hypervisor is configures a host hypervisor to assign an entirety of the logical core to a single physical core, such that one logical core executes per physical core. The logical core is run on the single physical core on an exclusive basis for a period of time, such that the logical threads of the logical core execute on physical threads of the single physical core. A capacity use time is determined for each of the logical threads executing on the physical threads of the single physical core.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 2C illustrates the computer system with further details of the hardware processor cores according to an embodiment.

DETAILED DESCRIPTION

Figure 1:
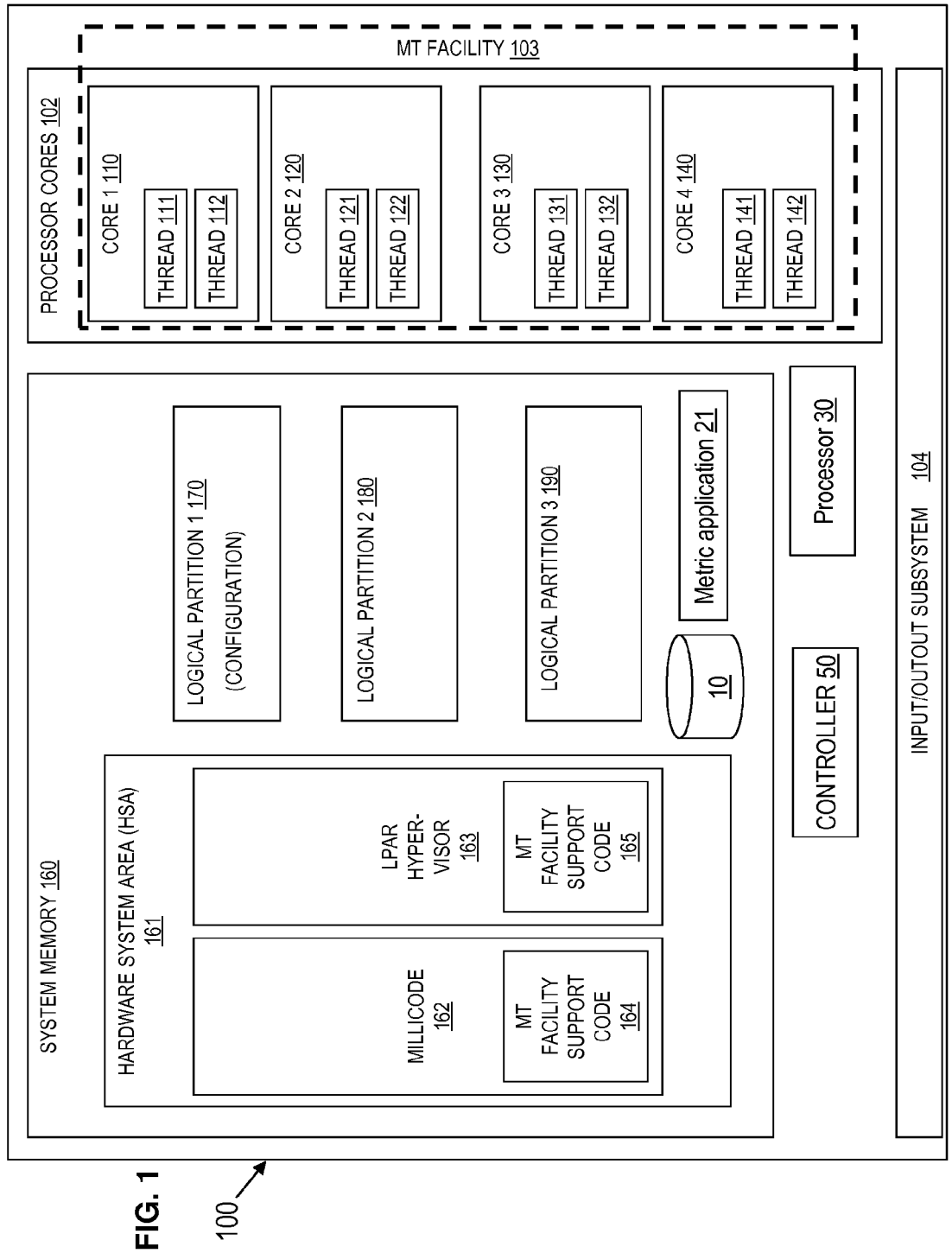
FIG. 1 illustrates a computer system as an example of a computing environment that supports simultaneous multithreading (SMT) according to an embodiment.

In computer systems (such as System z computer systems by International Business Machines Corporation (IBM)) of embodiments, guest hypervisors and operating systems manage and control the guest's workload and what executes on each thread for each core. Combining these design points with algorithms to steer cores to execute with a high thread density allows embodiments (including System z computer systems) to deliver a repeatable core capacity gain, repeatable thread speed degradation, and repeatable workload response time.

With SMT workload repeatability in place, guest hypervisors and operating systems require a way to measure the SMT effects on their workload at runtime. According to embodiments, core counter instrumentation provides the necessary insights in SMT to calculate all capacity planning metrics and core utilization with respect to capacity with 1 SMT measurement at runtime. Embodiments provide the software algorithms to turn the industry's uncontrollable, unmanageable, and variable SMT solution into a controllable, manageable, and repeatable SMT solution on computer systems (e.g., the System z computer system).

As used herein, a logical thread refers to a single guest instruction stream and its associated state. That is, at an architecture level, each logical thread represents an independent central processing unit (CPU). A logical core consists of multiple logical threads. Hardware dispatches a logical core (and all its logical threads) to a physical core (and its physical threads) and maintains the guest state. Therefore, the terms "thread" and "CPU" may be used interchangeably herein.

In an exemplary embodiment, a CPU contains sequencing and processing facilities for instruction execution, interruption action, timing functions, initial program loading, and other machine-related functions. A CPU defines logical functions that may map to a variety of underlying physical implementations. The CPU, in executing instructions, can process binary integers and floating-point numbers (e.g., binary, decimal, and hexadecimal) of fixed length, decimal integers of variable length, and logical information of either fixed or variable length. Processing may be in parallel or in series. The width of processing elements, multiplicity of shifting paths, and the degree of simultaneity in performing different types of arithmetic can differ from one model of CPU to another without affecting the logical results.

Instructions which the CPU executes can include a number of instruction classes, such as: general, decimal, floating-point-support (FPS), binary-floating-point (BFP), decimal-floating-point (DFP), hexadecimal-floating-point (HFP), control, and I/O instructions. The general instructions can be used in performing binary-integer-arithmetic operations and logical, branching, and other non-arithmetic operations. The decimal instructions operate on data in decimal format. The BFP, DFP, and HFP instructions operate on data in BFP, DFP, and HFP formats, respectively, while the FPS instructions operate on floating-point data independent of the format or convert from one format to another. Privileged control instructions and the I/O instructions can be executed when the CPU is in a supervisor state, and semi-privileged control instructions can be executed in a problem state, subject to appropriate authorization mechanisms.

The CPU provides registers which are available to programs but do not have addressable representations in main storage. The registers can include, for instance, a current program-status word (PSW), general registers, floating-point registers and a floating-point-control register, vector registers, control registers, access registers, a prefix register, a time-of-day (TOD)-programmable register, and registers for a clock comparator and CPU timer. This set of registers may be referred to as the CPU's architected register context. Each CPU in a configuration can provide access to a TOD clock, which may be shared by all CPUs in the configuration. An instruction operation code can determine which type of register is to be used in an operation.

Each CPU may have a type attribute that indicates whether it provides a full complement of functions and facilities (e.g., a general CPU), or whether it is intended to process specific types of workloads (e.g., a specialty CPU). A primary CPU is either a general CPU or a CPU having the same type as the CPU started following a last initial program load (IPL) operation (the IPL CPU). A secondary CPU is any CPU other than a general CPU having a CPU type that differs from the IPL CPU.

With simultaneous multithreading (SMT), multiple threads with ready instructions (not resolving a cache miss) compete to execute instructions on the same physical core. Running cache intensive workloads with SMT yields core capacity gains (i.e., the physical core executes more instructions) and thread speed degradations (threads executing instructions can temporarily block ready instructions of other threads). Core cycles with only 1 non-waiting thread receive no core capacity gain and no thread speed degradation. Note that a non-waiting thread is a thread executing/running on the physical core. Core cycles with multiple non-waiting threads receive core capacity gains and thread speed degradations, where each additional thread yields a smaller core capacity gain and larger thread speed degradation.

A multithreading facility may be available on a computer system that implements a supporting architecture. The multithreading facility provides support for multithreading to enable a group of threads, which may also be referred to as CPUs, that share a core. When the multithreading facility is enabled, the CPUs within a core may share certain hardware resources such as execution units or caches. When one CPU in a core is not ready to use hardware resources (typically, while resolving data in the memory nest), other CPUs in the core can utilize the shared core resources rather than have them remain idle. When the multithreading facility is installed and enabled, a thread is synonymous with a CPU that is a member of a core. When the multithreading facility is not installed, or the facility is installed but not enabled, a core comprises a single CPU or thread.

When the multithreading facility is installed, it may be enabled by execution of a set-multithreading signal processor (SIGP) order. In an exemplary embodiment, when the multithreading facility is enabled, the number of CPUs in a configuration is increased by a multiple, the value of which is determined by a program-specified maximum thread identification (PSMTID). The number of CPUs in a core can be one more than the PSMTID. A number of CPUs corresponding to this multiple are grouped into a core. Each core of the same CPU type in a configuration has the same number of CPUs. Each CPU within a core is of the same CPU type; however, based on the model and CPU type, some CPUs within a core may not be operational.

In an exemplary embodiment, a control program, such as an operating system (OS), explicitly enables multithreading in order for it to be usable by the configuration that the OS manages. Alternatively, a hypervisor can enable multithreading and guests of the hypervisor and their applications can benefit transparently. An application program is generally unaware of whether multithreading has been enabled. When multithreading is enabled, the CPU addresses of all CPUs in the configuration are adjusted to include a core identification (or core ID) in the leftmost bits of the address and a thread identification (thread ID, or TID) in the rightmost bits of the address. The core ID may also be referred to as a core address value, and the TID may be referred to as a thread address value. CPUs within a core may share certain hardware facilities such as execution units or lower-level caches, thus execution within one CPU of a core may affect the performance of other CPUs in the core.

In order to manage changes associated with dynamically switching one or more cores of a configuration between single thread and multithreading modes, a number of support features are included. To maintain compatibility with programs that do not support multithreading, a single thread mode may be the default mode upon a reset or deactivation. Exemplary embodiments include features to preserve, communicate, and restore thread context from the multithreading mode to support analysis and/or restoration of the thread context after transitioning from the multithreading mode to the single thread mode.

A computing environment that may be implemented by an exemplary embodiment can be based, for example, on the z/Architecture offered by International Business Machines Corporation, Armonk, N.Y. The z/Architecture is described in an IBM publication entitled, "z/Architecture Principles of Operation," IBM Publication No. SA22-7832-09, August 2012, which is hereby incorporated herein by reference in its entirety. In one example, a computing environment based on the z/Architecture includes an eServer zSeries, offered by International Business Machines Corporation, Armonk, N.Y. A computing environment can include, for example, a processor complex with one or more partitions (e.g., logical partitions) with one or more cores (e.g., processor cores), and one or more levels of hypervisors as further described herein.

FIG. 1 shows a computer system 100 as an example of a computing environment that supports multithreading (MT) according to an embodiment. In FIG. 1, the computer system 100 includes a plurality of hardware processor cores 102, an input/output (I/O) subsystem 104, and system memory 160. The I/O subsystem 104 can provide access to I/O devices known in the art. The processor cores 102, also referred to simply as "cores" or "physical cores" herein, can include processing circuitry with supporting elements. In FIG. 1, cores 102 are depicted as core_1 110, core_2 120, core_3 130, and core_4 140; however, a greater or fewer number of cores 102 is also contemplated. An MT facility 103 may be a hardware component of each of the cores 102. In this example, each of the cores 102 is capable of supporting up to two threads (although three, four, or five threads may be supported in other embodiments). For instance, core_1 110 can support threads 111 and 112. Core_2 120 can support threads 121 and 122. Core_3 130 can support threads 131 and 132. Core_4 140 can support threads 141 and 142. Note that not all threads of each core 102 may be operational at any instant. For example, in core_3 130, thread 131 may be operational/executing while thread 132 is not operational.

FIG. 1 also depicts the system memory 160 of the computer system 100, where parts of the system memory 160 are apportioned to logical partition 1 (LPAR1) 170, LPAR2 180, and LPAR3 190. The LPARs 170, 180, 190 represent virtualized computing systems (also known as configurations) in which an operating system such as Linux or the IBM z/OS™, z/VM, or zTPF operating system may be executed.

Figure 2A:
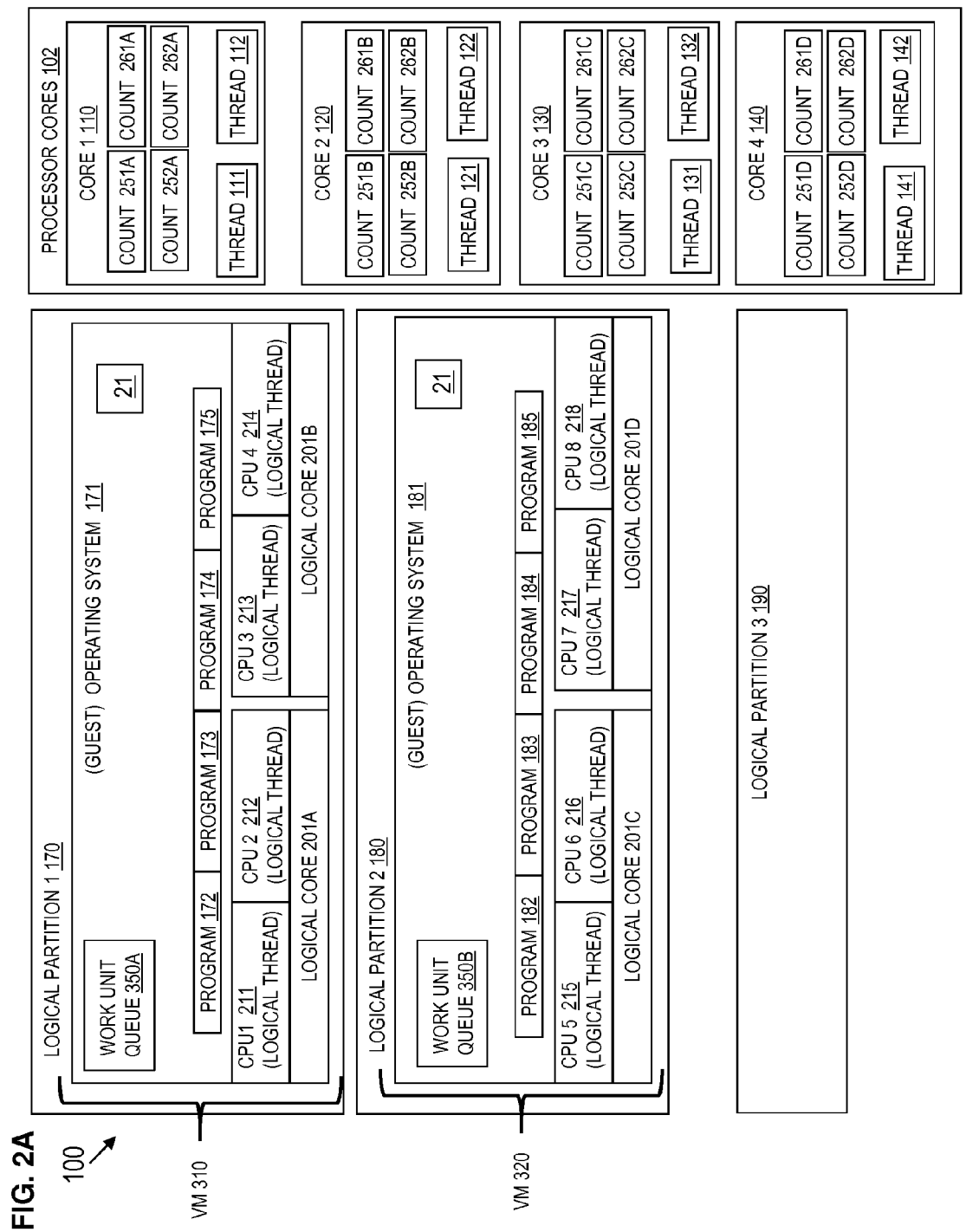
FIG. 2A illustrates the computer system with further details of the logical partitions and the hardware processor cores according to an embodiment.
Figure 2B:
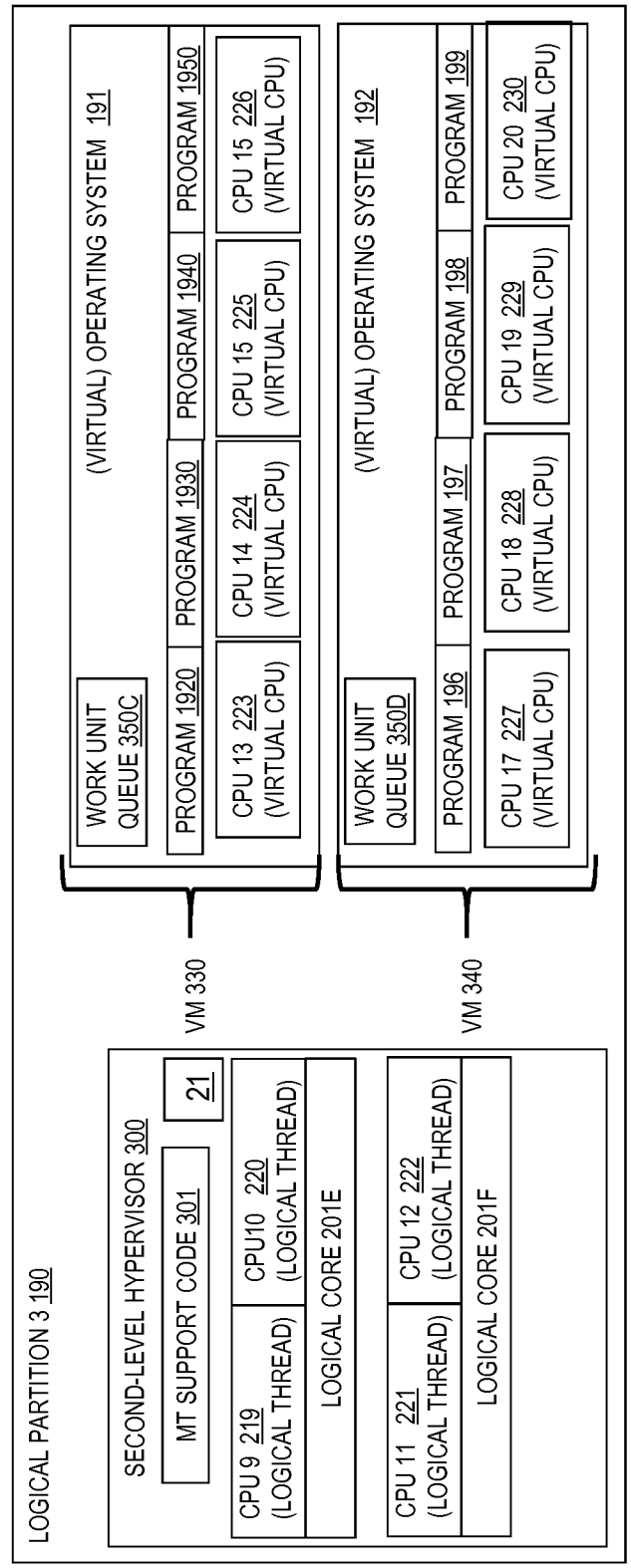
FIG. 2B illustrates the computer system with further details of a logical partition according to an embodiment.

FIGS. 2A, 2B, and 2C (generally referred to as FIG. 2) shows the computer system 100 with further details of the logical partitions 1, 2, 3 and further details of the hardware processor cores 102 according to an embodiment. Some details of the computer system 100 shown in FIG. 1 are omitted from FIG. 2, so as not to obscure FIG. 2 but the omitted elements are contemplated as part of FIG. 2. In FIG. 2A, LPAR1 170 provides processing resources for OS 171 and programs 172, 173, 174, and 175. LPAR2 180 provides processing resources for OS 181 and programs 182, 183, 184, and 185. Referring to FIG. 2B, LPAR3 190 provides processing resources for a second-level Hypervisor 300 and virtual OS 191 with programs 1920, 1930, 1940, and 1950 and virtual CPUs 223, 224, 225, and 226 and virtual OS 192 with programs 196, 197, 198, 199 and virtual CPUs 227, 228, 229, and 230.

Under control of an operating system executing in an LPAR, programs execute on the logical threads of a logical core. Under control of the second-level hypervisor 300 executing in the LPAR 3, guest operating system virtual CPUs execute on logical threads of a logical core. Subject to the control of an OS, different programs may be dispatched on the same or different threads, subject to dispatching rules and quality-of-service agreements.

Referring back to FIG. 1, also residing in the system memory 160 are various levels of firmware, including for example, Millicode 162 and LPAR hypervisor 163. The Millicode 162 can be embodied as firmware to support lower-level system functions. The LPAR hypervisor 163 may be, for example, licensed internal code such as the IBM Processor-Resource/System Manager™ (PR/SM™). The LPAR hypervisor may also be referred to as the host hypervisor. The LPAR hypervisor 163 can establish the LPARs 170, 180, 190 and may manage dispatching on the hardware processor cores 102. When the MT facility 103 is installed in the computer system 100, the Millicode 162 and LPAR hypervisor 163 also contain MT facility support code 164 and 165 respectively. The MT facility support code 164 and 165 may be considered part of the MT facility 103, as logic to support MT, and the MT facility support code 164 can be distributed between the Millicode 162, LPAR hypervisor 163, and the cores 102. Operating systems 171, 181 include multithreading facility support code to enable and exploit MT in their respective LPARs 170, 180. FIG. 2B depicts second-level hypervisor 300 executing virtual operating systems 191, 192 respectively of the computer system 100. The second-level hypervisor 300 for example, the IBM z/VM operating system, includes MT support code 301. The second-level hypervisor 300 respectively provides support for a plurality of virtual machines 330, 340 (also referred to as configurations) in which virtual operating systems 191, 192 operate respectively. The operating systems 171, 181, 191, 192 may include, for example, Linux or the IBM z/OS, z/VM, or z/TPF OS, or may include a guest development environment such as the IBM conversational monitor system (CMS). Note that the second-level hypervisor 300 (having MT support code 301) may be embodied in operating systems 171, 181, 191, 192 respectively.

The virtual machine 310 includes guest OS 171, programs 172, 173, 174, 175 and logical cores 201A and 201B. The guest OS 171 informs the (host) LPAR hypervisor 163 that OS 171 understands the multithreading architecture and creates logical cores and threads according to that architecture. Logical core 201 is configured to support and run two CPUs as logical threads. The logical core 201A supports CPU1 211 as the first logical thread and CPU2 212 as the second logical thread. Logical core 201B supports CPU3 213 as the first logical thread and CPU4 214 as the second logical thread. When a program such as program 172 becomes ready to execute, the operating system 171 dispatches program 172 on an available CPU such as CPU1 (logical thread 211) on logical core 201A. When program 173 becomes ready to execute, the operating system 171 dispatches program 173 on an available CPU such as CPU2 (logical thread 212) on logical core 201A. The LPAR hypervisor 163 then dispatches the entire logical core 201A onto a single physical core 102, such as, for example, onto core1 110. Core1 110 is configured to execute simultaneous multithreading using two threads which are the threads 111 and 112, such that CPU1 (logical thread 211) executes on physical thread 111 while CPU2 (logical thread 212) executes on physical thread 112. When dispatching a logical core 201 to a physical core 102, the LPAR hypervisor 163 is restricted to the rule that only one logical core 201 is dispatched to a single (hardware) physical core 102 at a time. This means that while logical core 201A is dispatched and executing on core1 110, the logical cores 201B-F cannot be executing on core1 110 (at that same time), and therefore, no logical threads (CPUs) for logical cores 201B-F can execute on the core1 110 during this time. Since guest OS 171 controls what two logical threads, CPU1 211 and CPU2 212, are assigned to the logical core 201A during multithreading, the guest OS 171 consequently controls physical thread 111 and physical thread 112 executing on physical core1 110, because the LPAR hypervisor 163 assigns the whole logical core 201A to (exclusively) run on the physical core1 110 at this point in time. At a later point in time, a different logical core 201 (such as logical core 201D) can be assigned to run on the core1 110 under the same rule.

The virtual machine 320 includes guest OS 181, programs 182, 183, 184, 185 and logical cores 201C and 201D. The guest OS 181 informs the (host) LPAR hypervisor 163 that OS 181 understands the multithreading architecture and creates logical cores and threads according to that architecture. Logical core 201 is configured to support and run two CPUs as logical threads. The logical core 201C supports CPU5 215 as the first logical thread and CPU6 216 as the second logical thread. Logical core 201D supports CPU7 217 as the first logical thread and CPU8 218 as the second logical thread. When a program such as program 182 becomes ready to execute, the operating system 181 dispatches program 182 on an available CPU such as CPU5 (logical thread 215) on logical core 201C. When program 183 becomes ready to execute, the operating system 181 dispatches program 183 on an available CPU such as CPU6 (logical thread 216) on the same logical core 201C. The LPAR hypervisor 163 then dispatches the entire logical core 201C onto a single physical core 102, such as, for example, onto core2 120. Core2 120 is configured to execute simultaneous multithreading using two threads which are the threads 121 and 122, such that CPU5 (logical thread 215) executes on physical thread 121 while CPU6 (logical thread 216) executes on physical thread 122. Again, when dispatching a logical core 201 to a physical core 102, the LPAR hypervisor 163 is restricted to the rule that only one logical core 201 is dispatched to a single (hardware) physical core 102 at a time. This means that while logical core 201C is dispatched and executing on core2 120, the logical cores 201A, B, D-F cannot be executing on core2 120 (at that same time), and therefore, no logical threads (CPUs) for logical cores 201A, B, D-F can execute on the core2 120 during this time. Since guest OS 181 controls what two logical threads, CPU5 215 and CPU6 216, are assigned to the logical core 201C during multithreading, the guest OS 181 consequently controls physical thread 121 and physical thread 122 executing on physical core2 120, because the LPAR hypervisor 163 assigns the whole logical core 201C to (exclusively) run on the physical core2 120 at this point in time. At a later point in time, a different logical core 201 (such as logical core 201D) can be assigned to run on the core2 120 under the same rule.

Referring to FIG. 2B, the virtual machine 330 includes virtual OS 191, programs 1920, 1930, 1940, 1950, and CPU13 223, CPU14 224, CPU15 225, CPU16 226 as virtual CPUs. The virtual machine 340 includes virtual OS 192, programs 196, 197, 198, 199, and CPU17 227, CPU18 228, CPU19 229, CPU30 230 as virtual CPUs. The virtual machines 330 and 340 are SMT ignorant and consequently do not have any logical cores 201 under the control of their operating systems 191, 192, and the respective CPUs of the operating systems 191, 192 are dispatched onto logical cores 201E and 201F via the second-level hypervisor 300. The hypervisor 300 includes logical core 201E and logical core 201F. Logical cores 201E and 201F are each configured to support and run two CPUs as logical threads. The logical core 201E supports CPU9 219 as the first logical thread and CPU10 220 as the second logical thread. Logical core 201F supports CPU11 221 as the first logical thread and CPU12 222 as the second logical thread. When a program such as program 1920 becomes ready to execute, the virtual operating system 191 dispatches program 1920 on an available CPU such as CPU13 (virtual CPU 223). When program 1930 becomes ready to execute, the operating system 191 dispatches program 1930 on an available CPU such as CPU14 (virtual CPU 224). The logical core 201E supports CPU9 219 and CPU10 220, while logical core 201F supports CPU1 1 221 and CPU12 222. The hypervisor 300 dispatches virtual CPU13 223 onto CPU9 219 of logical core 201E and dispatches CPU14 224 onto CPU10 220 of logical core 201E. Similarly, the hypervisor 300 dispatches CPU17 227 onto CPU11 221 of logical core 201F and dispatches CPU18 228 onto CPU12 222 of logical core 201F.

The LPAR hypervisor 163 then dispatches the entire logical core 201E onto a single physical core 102, such as, for example, onto core3 130. Core3 130 is configured to execute simultaneous multithreading using two threads which are the threads 131 and 132, such that CPU9 (logical thread 219) executes on physical thread 131 while CPU10 (logical thread 220) executes on physical thread 132. Again, when dispatching a logical core 201 to a physical core 102, the LPAR hypervisor 163 is restricted to the rule that only one logical core 201 is dispatched to a single (hardware) physical core 102 at a time. This means that while logical core 201E is dispatched and executing on core3 130, the logical cores 201A-D, F cannot be executing on core3 130 (at that same time), and therefore, no logical threads (CPUs) for logical cores 201A-D, F can execute on the core3 130 during this time. Since the second-level hypervisor 300 controls what two logical threads, CPU9 219 and CPU10 220, are assigned to the logical core 201E during multithreading, the second-level hypervisor 300 consequently controls physical thread 131 and physical thread 132 executing on physical core3 130, because the LPAR hypervisor 163 assigns the whole logical core 201E to (exclusively) run on the physical core3 130 at this point in time. At a later point in time, a different logical core 201 (such as logical core 201D) can be assigned to run on the core3 130 under the same rule.

Guest OS 171, 181 exploit multithreading by dispatching programs to logical CPUs (as logical threads) on logical cores 201 (each logical core 201 can have up to two CPUs (i.e., two logical threads)). Virtual operating systems 191 and 192 dispatches programs to virtual CPUs, and the second-level hypervisor 300 exploits multithreading by dispatching virtual CPUs to logical CPUs (as logical threads) on logical cores 201 (as discussed above with reference to FIG. 2B). This methodology in turn causes the LPAR hypervisor 163 to dispatch (only) one (guest) logical core 201 to (only) one physical core 110, 120, 130, and/or 140 at any given time. The LPAR hypervisor 163 controls which logical cores 201 are dispatched to and/or caused to execute on particular physical cores 102 (to run as respective threads 111, 112, 121, 122, 131, 132, 141, 142), but each guest OS and/or second level hypervisor controls which 1 or 2 logical threads (CPUs) are dispatched onto a logical core 201.

Figure 3:
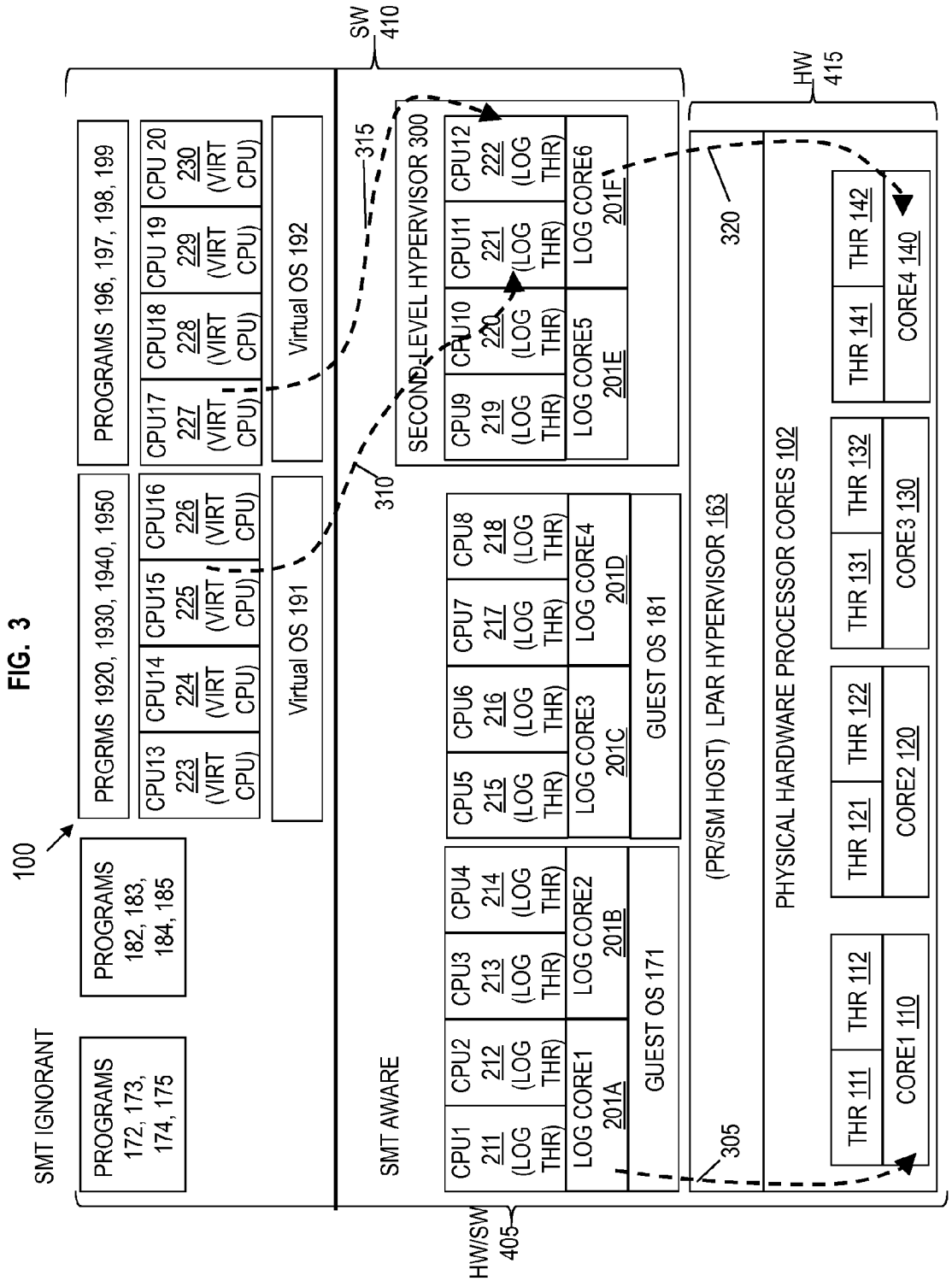
FIG. 3 illustrates a hardware/software (HW/SW) stack of the computer system according to an embodiment.

As a logical view of the hardware and software stack in the computer system 100, FIG. 3 depicts a hardware/software (HW/SW) stack 405 of the computer system 100 according to an embodiment. The HW/SW stack 405 contains SMT awareness to mitigate SMT variability. Hardware provides a Set Multi-Threading interface that second-level hypervisors (like z/VM) 300 and guest operating systems (like z/OS) 171, 181 use to inform the host (PR/SM) hypervisor 163 of the maximum thread id they intend to exploit. The Set Multi-Threading service makes thread id 0 through the maximum thread id available for use, the guest OS and second-level hypervisor create logical cores and threads, and the host (PR/SM) hypervisor 163 begins dispatching guest OS and second-level hypervisor logical cores 201 to physical cores 102.

As noted herein, each guest operating system 171, 181 can dispatch a program to a CPU (up to 2 CPUs/logical threads per logical core) to the respective logical core 201, and the LPAR hypervisor 163 assigns the entire logical core (having two logical thread at most (as two CPUs)) to a physical core 102. As one example, the guest OS 171 has work (or workloads) from programs 172 and 173 that need to execute as two separate instruction streams. The guest OS 171 assigns one instruction stream to CPU1 211 (as the first logical thread) and the other instruction stream to CPU2 212 (as the second logical thread). The host (LPAR) hypervisor 163 detects that guest OS 171 logical core1 201A (with its two logical threads) is ready. The host hypervisor 163 places (executes, runs, assigns) the entire logical core1 201A to physical core1 110 to execute, such that CPU1 211 (first logical thread) is executed/loaded as thread 111 and CPU2 212 (second logical thread) is executed/loaded as thread 112 on the physical core1 110. In FIG. 3, the dashed line 305 shows that logical core1 201A is executing on core1 110. Since the OS 171 controls what work is assigned to CPU1 211 (first logical thread) and CPU2 212 (second logical thread) on logical core1 201A and since the host hypervisor 163 is required to execute an entire logical core 201 (which is the logical core 201A in this example) on the core1 110 (in this example), the OS 171 (having MT awareness, i.e., knowing that the OS has more than 1 logical thread to a logical core 201) has de facto control over the physical core1 110 for the period of time when the host hypervisor 163 has assigned one of the processor cores 102 to the logical core1 201A). The host hypervisor 163 can assign logical core1 201A to any of the cores 102, and core1 110 is discussed for explanation purposes.

FIG. 2C illustrates further details of the processor cores 102 according to an embodiment. The cores 110, 120, 130, and 140 each contain core counters 251, 261, 252, 262 for counting the number of core cycles and the number of core instructions at each thread density, as discussed further herein.

The physical threads of the processor cores 102 each contain a physical thread timer that ticks for each core cycle. Physical thread 111 has physical thread counter 5111 and physical thread 112 has physical thread timer 5112 in core 110. Physical thread 121 has physical thread counter 5121 and physical thread 122 has physical thread timer 5122 in core 120. Physical thread 131 has physical thread counter 5131 and physical thread 132 has physical thread timer 5132 in core 130. Similarly, physical thread 141 has physical thread counter 5141 and physical thread 142 has physical thread timer 5142 in core 140.

Referring to FIG. 3, each virtual operating system 191 and 192 can dispatch a program to a virtual CPU and the second-level hypervisor 300 dispatches virtual CPUs to logical threads. As one example, the virtual OS 191 has work from program 1950 and dispatches that work unit to virtual CPU15 225 and virtual OS 192 has work from program 196 and dispatches that work on to virtual CPU17 227. The second-level hypervisor detects that virtual CPU15 225 and virtual CPU17 227 are ready and dispatches the virtual CPU15 225 to CPU1 1 211 (as the first logical thread) and virtual CPU17 227 to CPU12 222 (as the second logical thread) on logical core 201F as the dashed lines 310 and 315 illustrate. The algorithms of the second-level hypervisor 300 and OS 171, 181 must steer cores to execute with a high thread density. The host hypervisor 163 places (executes, runs, assigns) the entire logical core6 201F to physical core4 140 to execute, such that CPU11 221 (first logical thread) is executed/loaded as thread 141 and CPU12 222 (second logical thread) is executed/loaded as thread 142 on the physical core4 140, as shown by dashed line 320. The host hypervisor 163 can assign logical core4 201F to any of the cores 102, and core4 140 is discussed for explanation purposes.

Hardware Core Counter Instrumentation

In an SMT environment, a waiting thread is a thread that has not been dispatched with work such that the waiting thread is ready to be assigned work (i.e., a stream of instructions) and then execute. A core is waiting when all its threads are waiting. A non-waiting thread embodies one of the following states: executing instructions, competing to execute instructions, and/or resolving a cache miss. A core is non-waiting when 1 or more of its threads are non-waiting. A physical or logical core's thread density (such as physical core1 110 or logical core1 201A) represents the number of non-waiting threads at a given time for that physical or logical core. In the example, physical cores 102 and logical cores 201A-F can have a maximum of two threads each. A thread density 2 core contains 2 non-waiting threads, which means, for physical core 110 and logical core 201A that both physical threads 121 and 122 and logical threads 211 and 212, respectively, are executing. A thread density 1 core contains 1 non-waiting thread and 1 waiting thread (for any physical core such as core1 110 or logical core such as core1 201A). For example, when physical core 120 has a thread density 1, this means that one thread such as thread 121 is non-waiting (e.g., executing on the core 120) and the other thread such as thread 122 is waiting (e.g., not executing work on the core 120). This also means physical core 120 is executing a logical core, such as logical core3 201C operating at thread density 1 with logical thread 215 non-waiting and logical thread 216 waiting.

With reference to FIG. 2, each of the processor cores 102 (such as in System z) contain core counters 251, 261, 252, 262 for counting the number of core cycles and the number of core instructions at each thread density. For example, SMT hardware (such as System z SMT hardware) that supports 2 threads per core (SMT-2) contains the following core counters:

1) core cycle counters 251A, 251B, 251C, 251D (generally referred to as core cycle counters 251) each count core cycles operating at thread density 1 (C_1) for their respective cores 110, 120, 130, 140.

2) core instruction counters 261A, 261B, 261C, 261D (generally referred to as core instruction counters 261) each count core instructions complete at thread density 1 (I_1) for their respective cores 110, 120, 130, 140.

3) core cycle counters 252A, 252B, 252C, 252D (generally referred to as core cycle counters 252) each count core cycles operating at thread density 2 (C_2) for their respective cores 110, 120, 130, 140.

4) core instruction counters 262A, 262B, 262C, 262D (generally referred to as core instruction counters 262) each count core instructions complete at thread density 2 (I_2) for their respective cores 110, 120, 130, 140.

For every clock cycle the core (e.g., cores 110, 120, 130, 140) executes, the number of non-waiting threads determines whether the core cycle counter at thread density 1 (e.g., respective core cycle counter 251) or thread density 2 (e.g., respective core cycle counter 252) increments by 1. For example, for each clock cycle, the core cycle counter 251B increments by 1 for each cycle core 120 executes at thread density 1 (e.g., with a single non-waiting thread such as thread 121 or 122 but not both). For each clock cycle, the core cycle counter 252B increments by 1 for each cycle core 120 executes at thread density 2 (e.g., when both threads 121 and 122 are non-waiting on core 120).

Any instruction(s) that complete during a core cycle increment the core instruction count at the appropriate thread density. The clock cycle is the time between two adjacent pulses of the oscillator that sets the tempo of the computer processors (e.g., cores 110, 120, 130, 140). For example, for each clock cycle, the core instruction counter 261B increments by 1 for each time the core 120 completes execution of an instruction at thread density 1 (e.g., executes an instruction with a single non-waiting thread such as thread 121 or 122 but not both). For each clock cycle, the core instruction counter 262B increments by 1 for each time the core 120 completes execution of an instruction at thread density 2 (e.g., when both threads 121 and 122 are non-waiting).

For all state-of-the-art hardware platforms in the industry, cycle and instruction counts exist only on a thread basis. On such hardware, while a thread is executing (non-waiting) the thread cycle count increments with respect to the core frequency (clock speed) and the thread instruction count increments when each instruction completes. The industry thread counters provide no insight into the frequency the thread executes at thread density 1 (full access to the core resource at the maximum thread speed) or at thread density 2 (shared access with a workload dependent core capacity gain and thread speed degradation). At runtime the thread counters do not provide sufficient information to calculate capacity planning metrics including core capacity gains, core capacity utilization, and remaining core capacity available. However, according to embodiments, the processor cores 110, 120, 130, 140 in computer system 100 (such as a System z cores) contain core cycle and core instruction counts (via core cycle counters 251 and 252 and core instruction counters 261 and 262) at each thread density (both thread density 1 and 2) in addition to the industry's thread cycle and thread instruction counts. The individual core cycle and core instruction counts for each of the processor cores 102 may be stored in a database 10 in the system memory 160 of the computer system 100 (shown in FIG. 1). The core counter instrumentation provides the insights into SMT executed on the physical cores 110, 120, 130, 140 to calculate all capacity planning and charge back metrics, as discussed further herein.

Hypervisor and Operating System Core Virtualization: Second-level hypervisor 300 (such as z/VM) and/or operating systems 171, 181 (such as z/OS) exploiting SMT receive control over all logical threads (e.g., CPU 211, 212, 213, 214, 215, 216, 217, 218, 219, 220, 221, 222) on each logical/virtual core 201A, 201B, 201C, 201D, 201E, 201F. Virtual operating systems 191 and 192 are SMT ignorant, so the second-level hypervisor 300 is responsible for managing the SMT environment.

The SMT responsibilities of guest OS 171, 181 and second-level hypervisor 300 are to operate each logical core 201 with a high thread density (i.e., with 2 executing logical threads because physical cores 102 and logical cores 201 support 2 threads) to achieve a high core capacity gain. For example, the operating system 171 is implemented to run the logical core 201A with both CPUs 211 and 212 (i.e., two logical threads) instead of only 1 CPU 211 (if possible). The SMT responsibilities executed by the guest OS 171, 181, and second-level hypervisor 300 must satisfy the customer workload performance goals with the fewest number of logical cores 201 possible to practice good virtualization citizenship (this maximizes the number of physical cores 102 available for other guests OS because the host hypervisor 163 assigns a whole logical core 201 to a physical core 102, such that no other logical core 201 can simultaneously use that particular physical core). Adhering to (honoring) these SMT responsibilities uses physical core resources efficiently and provides guest operating systems and second-level hypervisors the framework necessary to deliver its workload a repeatable core capacity gain, thread speed degradation, response time, and latency. The operating systems 171, 181 and second-level hypervisor 300 each separately implement algorithms that satisfy the SMT responsibilities discussed herein. Algorithmically, the implementation satisfies these responsibilities with the following design points as discussed below.

When new work arrives into the operating system, the guest OS 171, 181, and/or second-level hypervisor 300 follow a "fill-and-spill" model for finding a waiting logical thread to dispatch new work. On guest OS 171, 181 "new work" means a program such as 172 became ready to run and on second-level hypervisor 300 "new work" means a virtual CPU such as virtual CPU15 became ready to run because virtual OS 191 dispatched a ready program like 1940 to virtual CPU 15. The "fill" component involves guest operating systems and/or second-level hypervisor steering new work to a waiting logical thread on a running logical core. A running logical core is a logical core 201 with a thread density of at least 1. When no candidates (i.e., no active logical core under the control of the particular operation system and/or second-level hypervisor) exist to satisfy the "fill" component, the guest operating system/second-level hypervisor may "spill" or steer new work to a waiting logical thread on a waiting logical core. A waiting logical core is a logical core with all its threads in a wait (e.g., both CPUs in a wait). When a thread finds no work ready to dispatch, that thread loads a wait (i.e., becomes a waiting thread). Work unit queues (e.g., respective work unit queues 350A, 350B, 350C, 350D on respective operating systems 171, 181, 191, 192) empty randomly, so random logical threads on random logical cores 201 load a wait. Over time, this can cause guest operating systems to neglect their SMT responsibilities to run logical cores with a high thread density. Guests adhere to (honor)

their SMT responsibilities despite threads randomly loading a wait using by implementing a contract algorithm. On a regular interval (e.g., 400 microseconds) for each work unit queue 350 the contract algorithm (individually implemented in each operating system 171, 181 and second-level hypervisor 300) counts the number of waiting threads on running logical cores (waiting logical threads on cores with a thread density greater than or equal to 1). If the number of waiting logical threads on running logical cores 201 in an operating system and/or second-level hypervisor exceeds the contract threshold (e.g., the contract threshold may be at least 2 waiting threads on running logical cores 201A and 201B in the operating system 171 which is the minimum number of waiting threads to yield a waiting core), the operating system and/or second-level hypervisor marks the best candidate running logical core (e.g., the candidate running logical core with the most waiting logical threads and/or when both logical cores have the same amount of waiting logical threads, the operating system selects one of the logical cores) to contract (i.e., to reduce). That is, the operating system and/or second-level hypervisor selects the best candidate logical core to contract such as 201A and marks it for contraction.

In the dispatcher of the operating system (OS 171, 181) and/or second-level hypervisor, when a thread detects that the logical core 201 it belongs to must contract, the thread loads a wait (via the operating system and/or second-level hypervisor). Via the operating system and/or second-level hypervisor, the last thread contracting (on a logical core) marks the virtual core contraction process as complete and then loads a wait.

In the industry (or state-of-the-art), the hypervisor or native hardware provides SMT transparently and can dispatch any guest threads on any core the hypervisor chooses. The hypervisor can legitimately choose to dispatch multiple guest threads originating from different guests (potentially running different workloads) on the same core. This design point also ensures the guest can only manage an individual thread resource and has no control over (or even awareness of) the other threads. Quantifying the core capacity gain the industry design provides approaches impossible (or highly unfeasible) due to the hypervisor's inability to execute all guests' workloads identically again. The industry approach to SMT promotes uncontrollable variability.

Chargeback: Some platforms and operating systems (e.g., System z running z/OS) support chargeback accounting to track the time each job executes on the CPU. A job is a group of 1 or more work units. In a non-SMT environment, z/OS calculates the CPU timer delta from dispatch to undispatch (typically some number of microseconds) which includes CPU time resolving cache misses and executing instructions. The z/OS then increments the job's chargeback accounting record by the CPU timer delta. The sum of the chargeback accounting record of every job correlates to the total CPU capacity use of a logical core 201, when SMT is not used. Customers can associate job names with divisions in their enterprise and send each division an expense report regularly (monthly, quarterly, etc.) to recover System z and z/OS operating costs. Divisions that run similar jobs during each expense period expect to receive a similar bill for those jobs.

However, with SMT, each thread contains a CPU (thread) timer that ticks for each core cycle and includes time resolving cache misses, executing ready instructions (when the thread wins the competition for the core), and competing to execute ready instructions (when the thread loses the competition for the core). If an OS exploiting SMT charges each job according to the CPU (thread) timer delta over the dispatch (as done when no SMT is utilized), OS would effectively account for the raw CPU time each job occupies a thread. From a customer perspective that time represents an arbitrary chargeback amount because that time does not correlate to core capacity use. The disconnect in the industry between the core capacity use with SMT (relative to core capacity use without SMT), and chargeback means that similar jobs fail to receive a similar, reliable, and repeatable chargeback amount with and without SMT. In an SMT environment, customers require chargeback of each job to correlate to core capacity use in order for similar jobs to receive a similar, reliable, and repeatable chargeback amount with and without SMT. However, embodiments provide features to address this.

According to embodiments, the computer system 100 provides core counter instrumentation to use statistical averages to calculate the average core capacity use with SMT (compared to without SMT), average thread density, a chargeback factor, and to convert arbitrary CPU (thread) timer into the effective core capacity use time. Without this technology in an SMT environment, the chargeback amount cannot reflect the core (102) capacity use (compared to without SMT) and similar jobs fail to receive a similar, reliable, and repeatable chargeback amount with and without SMT.

Capacity Planning Using Core Counter Instrumentation

The second-level hypervisor 300 (like z/VM) and operating system 171, 181 (like z/OS) calculate chargeback metrics over a chargeback time interval by using counters 251, 252, 261, 262. In one embodiment, a metric application 21 may be included in and/or integrated in the second-level hypervisor 300 and operating systems 171, 181 and hardware itself such as hardware controller 50 (application specific integrated circuit) (with a scope for the overall system or on a per second-level hypervisor or operating system basis) to perform features discussed herein. Examples may refer to calculations by the metric application 21, but it is contemplated that the hypervisor 300 and the operating systems 171, 181 and hardware itself can be configured to perform the same calculations. A general processor 30 (e.g., with one or more processor cores) may be utilized to execute general functions of the computer system 100, while the processor cores 102 are utilized by virtual machines in logical partitions 170, 180, 190. The hardware system area 161, including millicode 162 and LPAR hypervisor, and the metric application 21 execute on the processor 30.

The SMT runtime charge back metrics below illustrate the calculations for a workload exploiting simultaneous multithreading with 2 threads per core (SMT-2 core) for ease of understanding. Similar methodology applies for simultaneous multithreading with any number of threads per core 102. For SMT-2 cores, the metric application 21 (i.e., second-level hypervisor 300 and operating systems 171, 181 each) calculates and stores deltas (the number of counts) for each the following core counters per physical core 110, 120, 130, 140:

core cycles operating at thread density 1 (C_1) via each core cycle counter 251A, 251B, 251C, 251D;

core instructions complete at thread density 1 (I_1) via each core instructions counter 261A, 261B, 261C, 261D;

core cycles operating at thread density 2 (C_2) via each core cycle counter 252A, 252B, 252C, 252D; and core instructions complete at thread density 2 (I_2) via each core instructions counter 262A, 262B, 262C, 262D.

Note that the PR/SM host hypervisor 163 virtualizes the physical core counters and thread timers to the second-level hypervisor and OS. When PR/SM hypervisor 163 undispatches a logical core from a physical core, the hypervisor 163 saves the hardware core total count C_1, I_1, C_2, I_2 and thread timers; when PR/SM hypervisor 163 dispatches the logical core to a physical core, the hypervisor 163 restores the hardware core total count C_1, I_1, C_2, I_2 and thread timers. So when a second-level hypervisor and/or OS is performing the delta math for the core counters, the core total count C_1, I_1, C_2, I_2 really represents the deltas of each logical core 201. Similarly, when a second-level hypervisor and/or OS is performing the delta math for a thread timer, the thread timer represents a delta for a logical thread.

The LPAR hypervisor 163 individually identifies and stores in the database 10 each time a logical core 201 is dispatched to execute on a respective physical core 110, 120, 130, 140, along with a time stamp for the start and stop time. The database 10 can be realized as (include) the hardware data state associated with each logical core that is saved/restored on an undispatch/redispatch. The data being saved/restored is the total time the logical core that executed was dispatched to a physical core, and the core counters. The database 10 includes the identification of the logical core 201 (such as logical core 201A in OS 171), identification of the processor core 102 that the logical core 201 was run on, and the length of time the logical core 201 executed on that particular processor core 102 (e.g., logical core 201A executed on core physical 110 for 2 minutes), along with the counter information from each respective counter 251, 252, 261, 262 per physical core 110, 120, 130, 140. Assume that a customer has paid for a logical partition, such as the logical partition 1 170 having virtual machine 310 and OS 171, and assume metrics are needed to determine whether simultaneous multithreading is benefiting the customer, and if so, how. The metric application 21 obtains the collected data in database 10 for logical partition 1 of OS 171 having control of logical core 201A and 201B, and obtains how logical cores 201A and 201B were executed on respective cores 110, 120, 130, 140 with one thread and/or two threads, along with the length of time. The metric application 21 combines the data related to the various execution times and core counter deltas for logical cores 201A and 201B under control of the OS 171 for the customer. Although examples utilize logical partition 1 170 with OS 171 and logical cores 201A and 201B, the metric application 21 is configured to obtain execution times and core counter deltas for each logical partition 170, 180, 190 having its own operating system and/or second-level hypervisor and logical cores 201, and then perform calculations discussed herein. Note that the various calculations using formulae disclosed herein are described on an individual core basis but are also applicable to the sum of core counter deltas across multiple cores.

When a core contains a sufficient sample (sufficient instruction and cycle core counter deltas at each thread density, which may be predetermined) corresponding to a customer's logical partition (such as logical partition 1 170 for OS 171 with logical cores 201A, 201B), the deltas are a workload representative sample at each thread density.

These deltas enable the metric application 21 to calculate the average: Instructions Per Cycle (IPC) at a core scope for any thread density for the overall workload of each guest OS and second-level hypervisor, where the instruction per cycle (IPC) at thread density 1 is $IPC\_1 = I\_1/C\_1$ and where the instruction per cycle (IPC) at thread density 2 is $IPC\_2 = I\_2/C\_2$. Core counter deltas and statistical averages form the building blocks for all chargeback metrics calculated by the metric application 21 below. Again, note that examples are provided for processor cores 102 with a maximum thread density 2, but it is contemplated that the calculations may be performed for higher thread densities with any maximum.

The SMT Runtime Chargeback design requires using the core counters 251, 252, 262, 262 above to calculate the effective core capacity and then distribute that capacity across the threads using the core. These design points present the following challenges, which are addressed by features of embodiments:

1) Across the dispatch interval (typically some number of microseconds), the core cycle and core instruction deltas at any thread density generally fail to be a sufficient workload representative sample.

2) The operating system or second-level hypervisor manages the threads independently, so during 1 thread's dispatch the other thread state can be any combination of dispatching work (could be 1 or multiple work units) or waiting.

Figure 4:
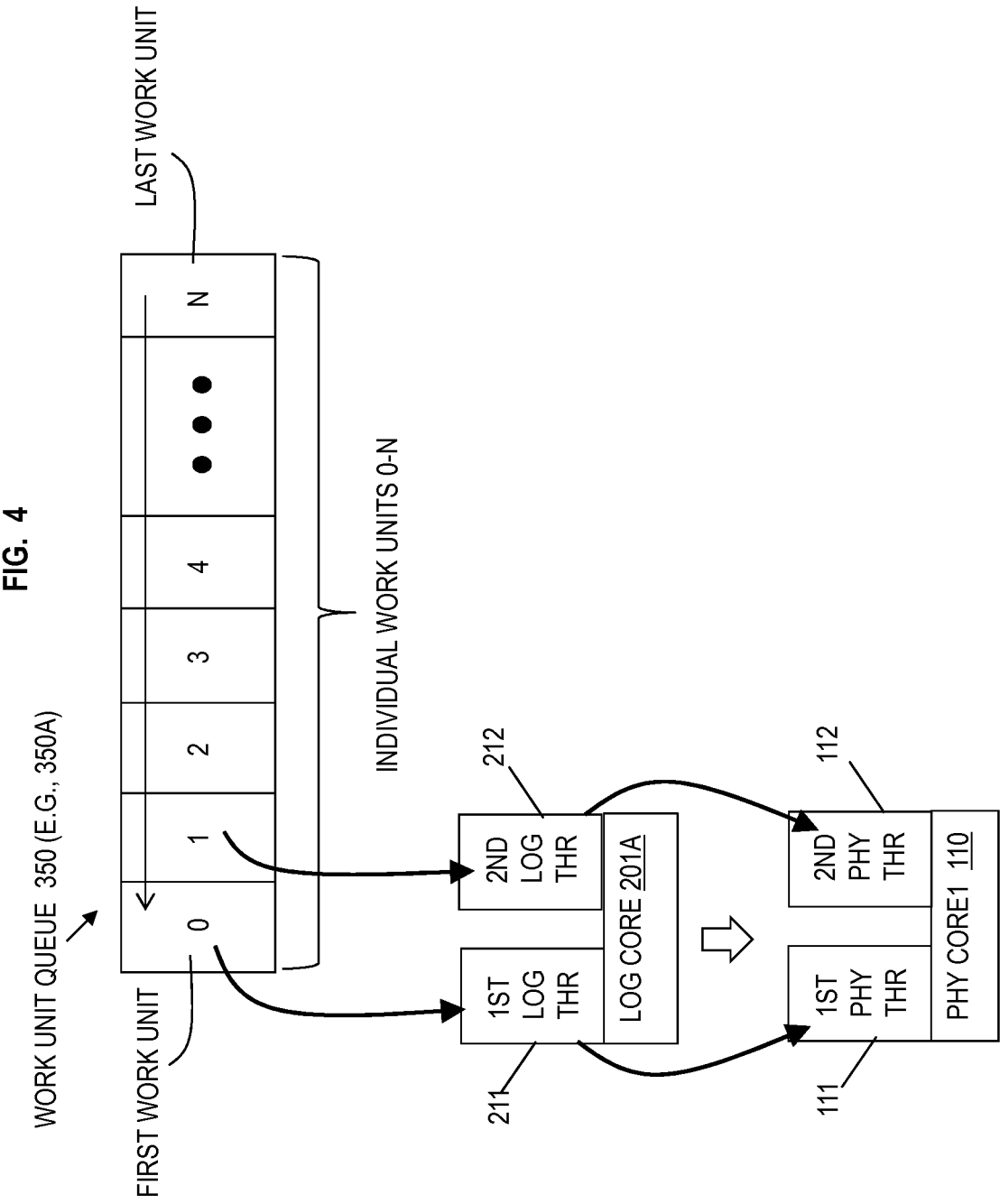
FIG. 4 illustrates an example of work units of work unit queues dispatched onto physical threads of a physical core according to an embodiment.

FIG. 4 illustrates an example of work units 1-N of work unit queue 350 where N represents the last work unit. The work units which execute during a time interval represent a workload. For a guest operating system OS 171, the work unit queue 350A consists of ready programs such as program 172 and 173. The guest operating system and/or second-level hypervisor dispatches the first work unit onto the first logical thread 211 and dispatches the next work unit onto the second logical thread 212 on logical core 201A. The host hypervisor 163 dispatches the entire logical core 201A onto the physical core 110 for execution, thereby executing the ready work units. For a second-level hypervisor 300, the processing is analogous except for the work unit queue consisting of ready virtual CPUs such as virtual CPU 223 and virtual CPU 224.

The dispatch interval is the amount of time that a work unit is dispatched to a logical thread (e.g., logical thread 211) of a logical core (e.g., logical core 201A) that is dispatched onto a physical thread of a physical core (e.g., physical thread 111 on core 110), as measured by delta in the physical thread timer (e.g., physical thread timer 5111). At the end of every dispatch, the physical thread timer delta must be converted to an amount of core capacity use. Calculating the necessary charge back metrics for the conversion requires a workload representative sample (sufficient instruction and cycle core counter deltas at all thread densities (obtained from counters 251, 252, 261, 262), which may be predetermined). In one case, an individual dispatch likely will not contain a sufficient workload representative sample, so the charge back metrics cannot be calculated on each dispatch interval. As the dispatch interval for calculating the charge back metrics lengthens, the probability of the core counters containing a sufficient workload representative sample at each thread density increases. So the operating system and/or second-level hypervisor calculates the charge back metrics using a chargeback interval size (which may be predetermined) so core counter deltas (obtained from counters 251, 252, 261, 262) contain a sufficient workload representative sample. Different workloads may require a different minimum chargeback interval. The SMT Runtime Chargeback design chooses a short (chargeback) interval (may be predetermined such as, e.g., 0.1 seconds (s) on z/OS) where all core counter deltas typically contain a sufficient workload representative sample. When any core counter delta does not represent a sufficient workload representative sample, the SMT Runtime Chargeback algorithm uses the last sufficient workload representative sample. The SMT Runtime Chargeback design is based on the fact that the workload tends to behave similarly between the previous and current chargeback intervals, so the corresponding charge back metrics between the previous and current charge back intervals should also be similar. This enables the operating system and/or second-level hypervisor to use charge back metrics based on statistical averages from the previous chargeback interval and apply them during the current chargeback interval.

SMT-2 Effective Runtime Capacity: To do meaningful chargeback in an SMT environment, the operating system 171, 181 and second-level hypervisor 300 requires understanding the SMT-2 Effective Runtime Capacity the workload attains. The SMT-2 Effective Runtime Capacity the workload realizes on average depends on the effective core capacity gain (which considers the time the core operates at thread density 1 and 2) with respect to how much work completes at thread density 1 (as the workload would execute without SMT).

The SMT-2 Effective Runtime Capacity requires a workload representative sample of cycles and instructions at thread density 1 and consists of the following formulae:

SMT-2 Workload IPC=$(I\_1+I\_2)/(C\_1+C\_2)$; and

SMT-2 Effective Runtime Capacity=(SMT-2 Workload IPC)/(IPC_1).

SMT-2 Effective Runtime Capacity represents the average effective core capacity that the operating system 171, 181 and second-level hypervisor 300 must distribute across the active threads on the logical core 201 (and the logical core 201 is then placed on a physical core 102).

SMT-2 Runtime Chargeback Factor: Distributing the SMT-2 Effective Runtime Capacity across the threads using the core for every work unit dispatch presents difficulties because each thread operates independently on the core. Over consecutive chargeback intervals, the workload (i.e., work units) itself tends to be similar, so the core's SMT-2 Effective Runtime Capacity and consequently the core's SMT-2 Runtime Average Thread Density tends to be similar as well. Over enough thread dispatches, the core operates at the SMT-2 Runtime Average Thread Density. Therefore over enough dispatches of an individual work unit (e.g., work unit queue 350A), that work unit executes on average at the SMT-2 Runtime Average Thread Density which consists of the following formula:

SMT-2 Runtime Average Thread Density=$(C\_1+2*C\_2)/(C\_1+C\_2)$.

With the SMT-2 Effective Runtime Capacity and the SMT-2 Runtime Average Thread Density, the operating system 171, 181 and second-level hypervisor 300 can calculate a SMT-2 Runtime Chargeback Factor so each thread can convert its dispatch CPU (thread) timer delta into effective core use time. The SMT-2 Runtime Chargeback Factor requires a sufficient sample of cycles and instructions at thread density 1 and 2 and consists of the following formula:

SMT-2 Runtime ChargeBack Factor=(SMT-2 Effective Runtime Capacity)/(SMT-2 Runtime Average Thread Density)

Chargeback Implementation: At the end of every chargeback interval (e.g., a chargeback interval may be assumed as 0.1 seconds), the operating system 171, 181 (z/OS) sums the core counter deltas from all cores assigned to the same Work Unit Queue and calculates the above metrics on a per Work Unit Queue basis. For example, assume that logical core 201A (and logical thread 211, 212) and 201B (and logical thread 213, 214) are assigned to dispatch work from work unit queue 350. Next assume that OS 171 brings logical thread 211, 212 on logical core 201A and logical thread 213, 214 on logical core 201B out of a wait in order to process programs 172, 173, 174, and 175 on Work Unit Queue 350A. The host hypervisor 163 places the entire logical core 201A and 201B on physical core 110 and 120 for execution. Before a thread dispatches a program from a Work Unit Queue, each thread captures the Work Unit Queue's SMT-2 Runtime Chargeback Factor. Each Work Unit Queue's SMT-2 Runtime Chargeback Factor may be stored respectively in the database 10. Accordingly, logical threads 211, 212, 213, 214 capture the runtime chargeback factor for work unit queue 350A. The static SMT-2 Runtime Chargeback Factor is used for calculating the total core capacity use during a dispatch (which includes the current dispatch, for executing programs doing delta math between the total core capacity use and a previous total core capacity use) and at the end of the dispatch (for chargeback). A frozen SMT-2 Runtime Chargeback Factor ensures that work units that request SMT-2 Effective Capacity Use Time during the dispatch remain less than or equal to the SMT-2 Effective Capacity Use chargeback calculated at the end of the dispatch. Then, the operating system 171 dispatches program 172, 173 to logical thread 211, 212 on logical core 201A and program 174, 175 to logical thread 213, 214 on logical core 201B. A second-level hypervisor 300 behaves analogously to OS 171 except that the Work Unit Queue consists of ready virtual CPUs like virtual CPUs 223, 224 from virtual OSes like 191. To calculate the SMT-2 Effective Capacity Use Time, the following formula is utilized:

SMT-2 Effective Capacity Use Time=(Thread (CPU) Timer delta)*(SMT-2 Runtime Chargeback Factor).

The thread (CPU) timer ticks whenever a logical thread is in a non-waiting state (e.g., executing instructions, competing to execute instructions, and/or resolving cache misses) on physical core resources. For example, OS 171 calculates the thread (CPU) timer 5111, 5112 delta (e.g., X microseconds) using the CPU timer from the start of the dispatch to end of the dispatch for program 172 on logical thread 211 and program 173 on the logical thread 212. The thread (CPU) timer delta represents the time a program on the thread is in a non-waiting state on a physical thread of physical core 102. Similarly, OS 171 calculates the thread (CPU) timer 5121, 5122 delta (e.g., Y microseconds) using the CPU timer from the start of the dispatch to end of the dispatch for program 174, 175 on logical thread 213, 214.

Since the physical core 110 uses simultaneous multithreading, when both physical thread 111 and 112 are ready to execute instructions on the core but physical thread 111 or 112 loses the competition for the core resources, physical thread timers 5111 and 5112 continue ticking as long as work units are non-waiting on physical core 110. Therefore, to determine the effective capacity use time for program 172, 173 during a dispatch on logical thread 211, 212, the OS 171 has to calculate the physical thread time delta while program 172, 173 was dispatched, and the multiply the physical thread time delta by the runtime chargeback factor; this equals the effective capacity use time for the workload while program 172, 173 executed on physical hardware core 110. Similarly, to determine the effective capacity use time for program 174, 175 during a dispatch on logical thread 213, 214, follow similar methodology. Programs 172, 173, 174, and 175 may belong to different jobs in different divisions. Accordingly, program 172 and 173 may belong to job 1 from the research division and program 174 and 175 may belong to the business division and at the end of the month each division receives a bill for the jobs executed.

Figure 5:
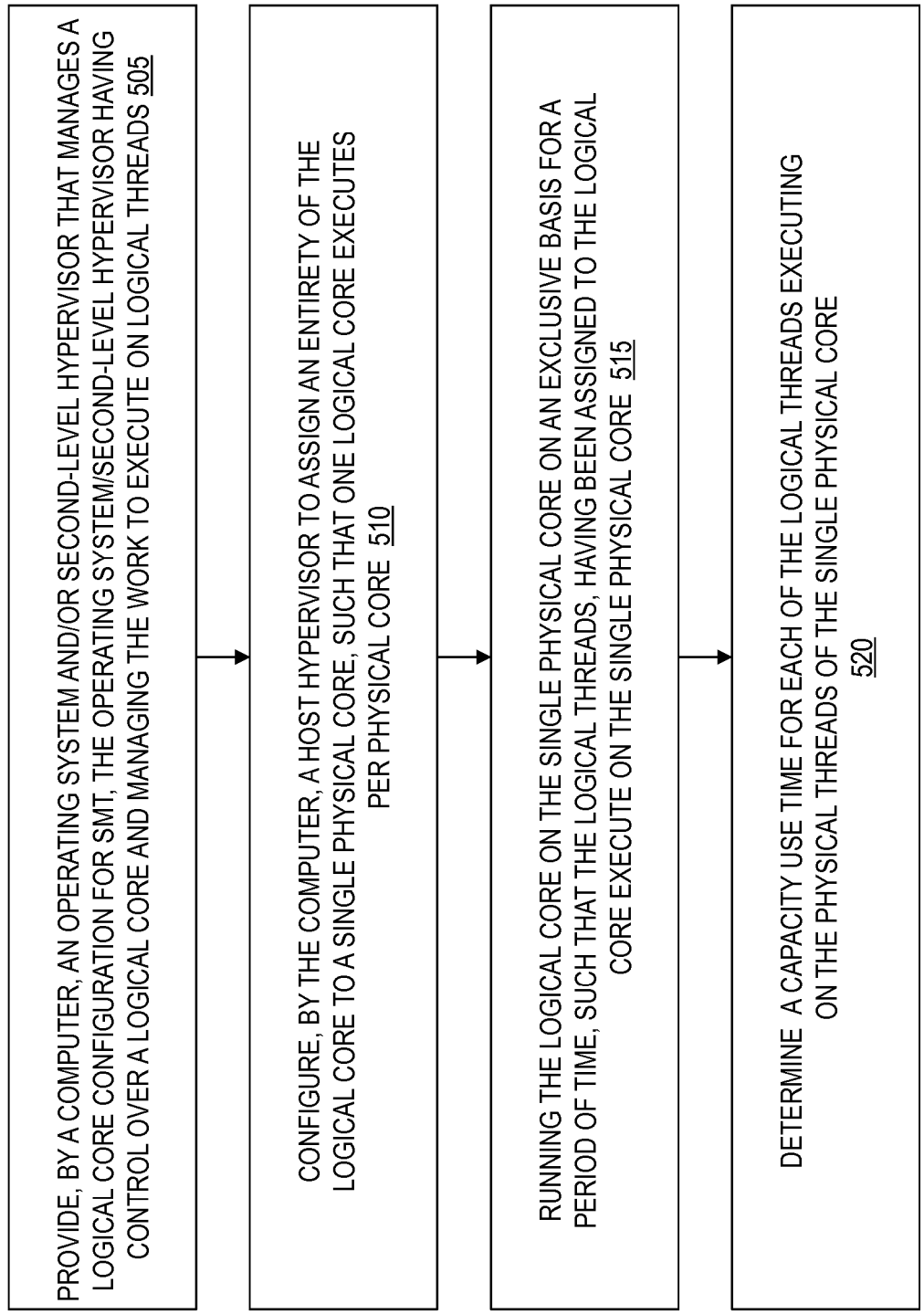
FIG. 5 illustrates a method for chargeback with simultaneous multithreading (SMT) executed on the computer system according to an embodiment.

FIG. 5 illustrates a method for chargeback with simultaneous multithreading (SMT) executed by the OS 171, 181, and/or second-level hypervisor 300 on the computer system 100 according to an embodiment.

The computer system 100 provides operating systems 171, 181 and second-level hypervisor 300 that manage a logical core configuration (2 logical cores) for simultaneous multithreading, where the operating system and second-level hypervisor have control over a logical core and each logical thread on each logical core (e.g., what work is loaded onto a logical thread/CPU), at block 505.

At block 510, the computer system 100 includes the host (LPAR) hypervisor 163 configured to assign an entirety of the logical core (e.g., all logical threads/CPUs 211 and 212 of virtual core 201A) to a single physical core (e.g., logical core 201A may be assigned to physical core 110), such that one logical core executes per physical core on the processor cores 102. For example, the host hypervisor 163 cannot assign both logical thread/CPU 211 (of logical core 201A) and logical thread/CPU 213 (of logical core 201B) to physical core 110, because an entire logical core 201 (only one) must be assigned/dispatched to physical core 110, and the logical threads from more than one logical core 201 cannot be assigned to the same physical core 110.

At block 515, the computer system 100 runs the logical core (logical core 201A) on the single physical core (physical core 110) on an exclusive basis for a period of time (Z amount of microseconds or seconds which is until the time slice expires and/or corresponding work units (i.e., work, workload, etc.) in work unit queues 350A are completed). For example, the logical core 201A may be dispatched by the host hypervisor 163 to the physical core 110 for X amount of seconds or X amount of microseconds, while no other logical core 201 can be dispatched to the physical core 110. The host hypervisor 163 assigns one entire logical core 201 (e.g., logical core 201A) to one physical core 102, such as core 110, at a time for the exclusive basis to perform simultaneous multithreading.

The workload (i.e., work units from work unit queue 350A on logical thread 211, 212) of what the single physical core 110 is executing is restricted back (corresponds) to the logical threads/CPUs 211 and 212 on logical core 201A. The operating system 171 manages the logical core 201A and at least another logical core 201B (in one case there could be 3, 4, 5, etc., additional logical cores under the control of the OS 171) as the logical core configuration. The operating system 171 places new work from work unit queue 350A on non-waiting logical cores that have a waiting thread available before placing work on waiting logical cores. The host hypervisor 163 dispatches the logical core to a single physical core on an exclusive basis for a period of time, such that the logical threads of the logical core execute on physical threads of the single physical core.

At block 520, the OS 171, 181, and/or second-level hypervisor 300 determines a capacity use time for each of the logical threads 211 and 212 respectively executing on the physical threads 111 and 112 of the single physical core 110.

Each of the physical threads (e.g., physical threads 111 and 112) includes a physical thread timer (e.g., physical thread timers 5111 and 5112), which can be stored in the database 10. The OS 171, 181, and/or second-level hypervisor 300 retrieves the individual timings from respective physical thread timers 5111 and 5112 in each of the physical threads 111 and 112 in the single physical core 110.

Determining the capacity use time for each of the logical threads 211 and 212 executing on the physical threads 111, 112 of the single physical core 102 comprises correlating the timings from the physical thread timers 5111 and 5112 to individual ones of the logical threads 211, 212 on the logical core 201A. The OS 171, 181, and/or second-level hypervisor 300 determines an individual capacity use time for one logical thread (e.g., logical thread 211), and the individual capacity use time is calculated based on an individual timing (thread (CPU) timer delta for logical thread 211 executed on physical thread 111) for the one logical thread multiplied by a runtime chargeback factor. Similarly, the OS 171, 181, and/or second-level hypervisor 300 determines an individual capacity use time for one logical thread (e.g., logical thread 212), and the individual capacity use time is calculated based on an individual timing (CPU (thread) timer delta for logical thread 212 executed on physical thread 112) for the one logical thread multiplied by the runtime chargeback factor.

The runtime chargeback factor is based on runtime capacity and runtime average thread density. The OS 171, 181, and/or second-level hypervisor 300 determine core cycles operating at thread density 1 ($C\_1$), determine core instructions complete at thread density 1 ($I\_1$), determine core cycles operating at thread density 2 ($C\_2$), and determine core instructions complete at thread density 2 ($I\_2$).

The OS 171, 181, and/or second-level hypervisor 300 determines instructions per cycle (IPC) at thread density 1 as $IPC\_1 = I\_1/C\_1$, determines instructions per cycle (IPC) at thread density 2 as $IPC\_2 = I\_2/C\_2$. The OS 171, 181, and/or second-level hypervisor 300 calculates the workload instructions per cycle as workload $IPC = (I\_1 + I\_2)/(C\_1 + C\_2)$, an effective runtime capacity metric as effective runtime capacity=(workload IPC)/(IPC\_1), a runtime average thread density as average thread density=$(C\_1 + 2*C\_2)/(C\_1 + C\_2)$, a runtime chargeback factor as runtime chargeback factor= (runtime capacity)/(runtime average thread density), and a capacity use time metric as capacity use time=(thread timer delta)*(runtime chargeback factor). The thread timer delta is the time a program executes on a thread from dispatch to undispatch.

In one case, the hardware controller 50 is configured to determine the instructions per cycle (IPC) at thread density 1, determine the instructions per cycle (IPC) at thread density 2, calculate the workload instructions per cycle, calculate the effective runtime capacity metric, calculate the runtime average thread density, calculate the runtime chargeback factor, and/or calculate the capacity use time metric.

A non-waiting thread, a non-waiting core, and a non-waiting CPU are all in a non-waiting state. A non-waiting state may correspond to running, being active, not being idle, and/or being loaded/assigned work. A waiting thread, a waiting core, and a waiting CPU are all in a waiting state. A waiting state may correspond to not running, not being loaded with work, being idle or on standby, and/or not being loaded with a thread (for a core).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for chargeback with simultaneous multi-threading (SMT) by a computer, the method comprising:
   managing, by one or more of an operating system and a second-level hypervisor of the computer, a logical core configuration for simultaneous multithreading, the one or more of the operating system and the second-level hypervisor having control over a logical core and control over logical threads on the logical core;
   configuring, by the one or more of the operating system and the second-level hypervisor of the computer, a host hypervisor to assign an entirety of the logical core to a single physical core, such that one logical core executes per physical core;
   running the logical core on the single physical core on an exclusive basis for a period of time, such that the logical threads of the logical core execute on physical threads of the single physical core;
   determining a capacity use time for each of the logical threads executing on the physical threads of the single physical core;
   determining core cycles operating at a thread density of 1 (C_1);
   determining core instructions complete at a thread density of 1 (I_1);
   determining core cycles operating at a thread density of 2 (C_2); and
   determining core instructions complete at a thread density of 2 (I_2);
   determining instructions per cycle (IPC) at a thread density of 1 as IPC 1=I_1/C_1; and
   determining instructions per cycle (IPC) at a thread density of 2 as IPC 2=I_2/C_2;
   calculating a workload instructions per cycle as workload IPC=(I_1+I_2)/(C_1+C_2);
   calculating an effective runtime capacity metric as effective runtime capacity=(workload IPC)/(IPC_1);
   calculating a runtime average thread density as average thread density=(C_1+2*C_2)/(C_1+C_2);
   calculating a runtime chargeback factor as runtime chargeback factor=(runtime capacity)/(runtime average thread density);
   calculating a capacity use time metric as capacity use time=(thread timer delta)*(runtime chargeback factor);
   wherein the thread timer delta is the timing for one of the logical threads.

2. The method of claim 1, wherein each of the physical threads includes a physical thread timer.

3. The method of claim 2, further comprising retrieving a timing from physical thread timers in each of the physical threads in the single physical core.

4. The method of claim 3, wherein determining the capacity use time for each of the logical threads executing on the physical threads of the single physical core comprises correlating the timing from the physical thread timers to individual ones of the logical threads on the logical core.

5. The method of claim 4, further comprising determining an individual capacity use time for one logical thread, the individual capacity use time being calculated based on an individual timing for the one logical thread multiplied by a runtime chargeback factor.

6. The method of claim 5, wherein the runtime chargeback factor is based on SMT effective runtime capacity relative to an effective runtime capacity without SMT and runtime average thread density.

7. The method of claim 1, wherein a hardware controller is configured to perform one or more of the following: determine the instructions per cycle (IPC) at a thread density of 1, determine the instructions per cycle (IPC) at a thread density of 2, calculate the workload instructions per cycle, calculate the effective runtime capacity metric, calculate the runtime average thread density, calculate the runtime chargeback factor, and calculate the capacity use time metric.

8. A computer program product for chargeback with simultaneous multithreading (SMT), the computer program product comprising a computer readable storage medium having program instructions embodied therewith, the program instructions executable by a computer to cause the computer to perform a method comprising:
   managing, by one or more of an operating system and a second-level hypervisor of the computer, a logical core configuration for simultaneous multithreading, the one or more of the operating system and the second-level hypervisor having control over a logical core and control over logical threads on the logical core;
   configuring, by the one or more of the operating system and the second-level hypervisor of the computer, a host hypervisor to assign an entirety of the logical core to a single physical core, such that one logical core executes per physical core;
   running the logical core on the single physical core on an exclusive basis for a period of time, such that the logical threads of the logical core execute on physical threads of the single physical core;
   determining a capacity use time for each of the logical threads executing on the physical threads of the single physical core;
   determining core cycles operating at a thread density of 1 (C_1);
   determining core instructions complete at a thread density of 1 (I_1);
   determining core cycles operating at a thread density of 2 (C_2);
   determining core instructions complete at a thread density of 2 (I_2); determining instructions per cycle (IPC) at a thread density of 1 as IPC 1=I_1/C_1;
   determining instructions per cycle (IPC) at a thread density of 2 as IPC 2=I_2/C_2;
   calculating a workload instructions per cycle as workload IPC=(I_1+I_2)/(C_1+C_2);
   calculating an effective runtime capacity metric as effective runtime capacity=(workload IPC)/(IPC_1);
   calculating a runtime average thread density as average thread density=(C_1+2*C_2)/(C_1+C_2);
   calculating a runtime chargeback factor as runtime chargeback factor=(runtime capacity)/(runtime average thread density); and
   calculating a capacity use time metric as capacity use time=(thread timer delta)*(runtime chargeback factor);
   wherein the thread timer delta is the timing for one of the logical threads.

9. The computer program product of claim 8, wherein each of the physical threads includes a physical thread timer.

10. The computer program product of claim 9, further comprising retrieving a timing from physical thread timers in each of the physical threads in the single physical core.

11. The computer program product of claim 10, wherein determining the capacity use time for each of the logical threads executing on the physical threads of the single physical core comprises correlating the timing from the physical thread timers to individual ones of the logical threads on the logical core.

12. The computer program product of claim 11, further comprising determining an individual capacity use time for one logical thread, the individual capacity use time being calculated based on an individual timing for the one logical thread multiplied by a runtime chargeback factor.

13. The computer program product of claim 12, wherein the runtime chargeback factor is based on SMT effective runtime capacity relative to an effective runtime capacity without SMT and runtime average thread density.

* * * * *